US009284987B2

(12) United States Patent
Murphy

(10) Patent No.: US 9,284,987 B2
(45) Date of Patent: Mar. 15, 2016

(54) WARNING DEVICE FOR MONITORING A HEALTH STATUS OF A BEARING HAVING A CLOSE RANGE WIRELESS INTERFACE

(71) Applicant: Aktiebolaget SKF, Göteborg (SE)

(72) Inventor: Jon D Murphy, Friday Harbor, WA (US)

(73) Assignee: AKTIEBOLAGET SKF, Gothenburg (SE)

( * ) Notice: Subject to any disclaimer, the term of this patent is extended or adjusted under 35 U.S.C. 154(b) by 169 days.

(21) Appl. No.: 14/041,642

(22) Filed: Sep. 30, 2013

(65) Prior Publication Data

US 2014/0152451 A1 Jun. 5, 2014

Related U.S. Application Data

(63) Continuation-in-part of application No. PCT/US2012/067293, filed on Nov. 30, 2012.

(51) Int. Cl.
*G08B 21/00* (2006.01)
*F16C 41/00* (2006.01)
*F16C 19/52* (2006.01)

(52) U.S. Cl.
CPC ............ *F16C 41/008* (2013.01); *F16C 19/525* (2013.01)

(58) Field of Classification Search
None
See application file for complete search history.

(56) References Cited

U.S. PATENT DOCUMENTS

| | | | |
|---|---|---|---|
| 5,691,707 A * | 11/1997 | Smith et al. .................... | 340/682 |
| 5,736,937 A | 4/1998 | McGirr et al. | |
| 6,114,966 A * | 9/2000 | Eguchi ........................... | 340/682 |
| 6,392,584 B1 | 5/2002 | Eklund | |
| 6,546,814 B1 | 4/2003 | Choe et al. | |
| 7,705,743 B2 * | 4/2010 | Barone et al. ................. | 340/682 |
| 8,471,682 B1 * | 6/2013 | Gilboy ........................... | 340/10.4 |
| 2002/0186134 A1 * | 12/2002 | Rehfus et al. ................. | 340/572.8 |
| 2003/0091253 A1 | 5/2003 | Morita et al. | |
| 2004/0138832 A1 | 7/2004 | Judd | |
| 2005/0155429 A1 | 7/2005 | Griessler et al. | |
| 2006/0170551 A1 * | 8/2006 | Nakamura et al. ........... | 340/572.1 |
| 2008/0238636 A1 * | 10/2008 | Birging et al. ................. | 340/426.1 |
| 2009/0023115 A1 | 1/2009 | Bohner et al. | |
| 2009/0046966 A1 * | 2/2009 | Weber ............................ | 384/477 |
| 2009/0128330 A1 * | 5/2009 | Monroe ......................... | 340/568.1 |
| 2009/0140840 A1 * | 6/2009 | Corts et al. .................... | 340/10.1 |
| 2009/0179748 A1 * | 7/2009 | Stephen et al. ................ | 340/447 |
| 2009/0267429 A1 * | 10/2009 | Moller et al. .................. | 310/66 |
| 2010/0014876 A1 | 1/2010 | Shimizu | |
| 2010/0315204 A1 * | 12/2010 | Kamel ........................... | 340/10.51 |
| 2011/0282540 A1 * | 11/2011 | Armitage et al. .............. | 701/29 |
| 2013/0027216 A1 * | 1/2013 | Jantz et al. .................... | 340/854.4 |

* cited by examiner

*Primary Examiner* — Travis Hunnings
(74) *Attorney, Agent, or Firm* — Bryan Peckjian; SKF USA Inc. Patent Dept.

(57) ABSTRACT

A warning device having a close range wireless interface is provided. The warning device includes a body portion, top portion, a base portion, a microcontroller for controlling the device, a battery, at least one sensor for sensing at least one of a velocity, an enveloped acceleration and a temperature reading of the bearing, and at least one illuminating device for displaying the health status of the bearing. The close range wireless interface includes an RFID tag having an integrated circuit, and a radio, an antenna for receiving and transmitting modulated and demodulated signals, and a digital bus connecting the microcontroller to the RFID tag. The microcontroller stores at least one of the sensed velocity, enveloped acceleration and the temperature values into a memory disposed within the RFID tag. The memory is a dual access memory that enables data transfer via the RFID radio or via the digital bus.

18 Claims, 10 Drawing Sheets

WARNING DEVICE FOR MONITORING A HEALTH STATUS OF A BEARING HAVING A CLOSE RANGE WIRELESS INTERFACE

CROSS-REFERENCE TO RELATED APPLICATIONS

This application is a Continuation in Part Application claiming the benefit of priority to International Patent Application No. PCT/US2012/67293 filed on Nov. 30, 2012, which claims the benefit of priority to U.S. Provisional Patent Application No. 61/577,884, filed on Dec. 20, 2011.

FIELD OF THE INVENTION

The present disclosure generally relates to a device for monitoring a health status of a bearing mounted to a piece of rotating industrial machinery. More particularly, the present disclosure relates to a warning device permanently mounted to a piece of rotating industrial machinery having a close range wireless interface.

BACKGROUND OF THE INVENTION

The present invention provides a simple, low cost way to monitor the status of a bearings health in a piece of rotating industrial equipment. Historically simple transmitter based systems have been employed on industrial machinery for overall machine health and detection of bearing degradation. These devices measure continuously and can be connected to existing control systems (PLC or DCS). The simplest approach is a 420 VT Vibration Transmitter. This loop-powered device measures Velocity (and can include Temperature) and has an End-User price of about $ 400.00. Also, a major consideration is the installation cost, especially for cabling. The present invention provides a low cost battery powered device that includes a close range wireless interface or RFID interface. One that is packaged into a compact unit and requires no setup or configuration. Since the Wireless interface requires no configuration and adds little cost the added value is significant. The MCI can now be integrated into a mobile data collection program. The customer gets round the clock monitoring of machinery and can retrieve the current machine status and data whenever an operator visits the machine.

SUMMARY OF THE INVENTION

The basic inventive concept provides a warning device for monitoring a health status of a bearing mounted to a piece of rotating machinery in an industrial environment having a close range wireless interface, the warning device comprising:
  a body portion connected to a top portion and a base portion, a microcontroller for controlling the device, a battery for powering the device, at least one sensor for sensing at least one of a velocity, an enveloped acceleration and a temperature reading of the bearing, and at least one illuminating device for displaying the health status of the bearing according to input from one of the at least one sensors; the close range wireless interface including:
    an RFID tag having an integrated circuit for storing and processing information, and a radio for modulating and demodulating a radio-frequency signal,
    an antenna for receiving and transmitting the modulated and demodulated signal, and connected to the RFID tag, and
    a digital bus connecting the microcontroller to the RFID tag, wherein
    the microcontroller stores at least one of the sensed velocity, enveloped acceleration and the temperature values into a memory disposed within the RFID tag, and wherein
    the memory is a dual access memory that enables data transfer via the RFID radio or via the digital bus.

In a second aspect of the present invention the RFID tag provides a non-volatile memory that stores the tag's information.

In a third aspect of the present invention the RFID tag stores product-related information such as a production date.

In another aspect of the present invention the RFID tag stores a unique tag serial number.

In another aspect of the present invention the RFID tag stores a machine or asset name.

In another aspect of the present invention the RFID tag stores a description.

In another aspect of the present invention the RFID tag stores a status. Offline spare, online, operational status In another aspect of the present invention the RFID tag stores a measurement history.

In another aspect of the present invention the RFID tag further stores the unique tags location.

In another aspect of the present invention the antenna is disposed within the top portion.

In another aspect of the present invention the battery provides power to the RFID device for at least 3 years of normal operation with a single alarm detection.

In another aspect of the present invention the device provides a flex circuit built into the RFID antenna, the flex circuit connecting the antenna to the RFID tag.

In another aspect of the present invention the RFID antenna further includes a coil inductor mounted on a PCB, the inductor coil connecting the antenna to the RFID tag.

In another aspect of the present invention the RFID antenna has tuned loops of copper wire, the tuned loops of wire connecting the antenna to the RFID tag.

In another aspect of the present invention the access to the RFID tag is password protected.

In a final aspect of the present invention the at least one illuminating device further provides three light emitting diodes disposed within the top portion for manually displaying the health status of the bearing.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
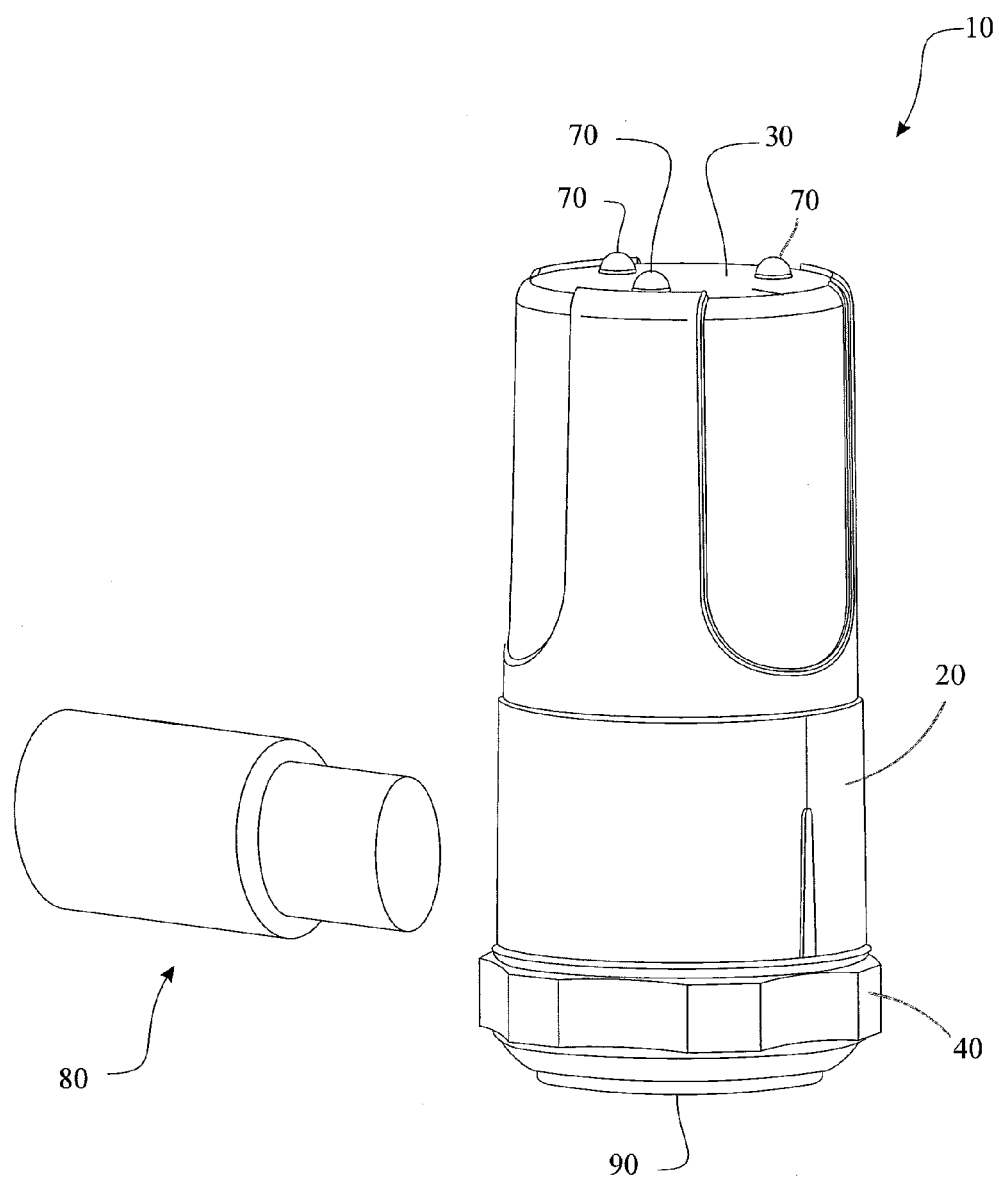
FIG. 1 is an elevated perspective view of a warning device according to a preferred embodiment of the present invention.
Figure 2:
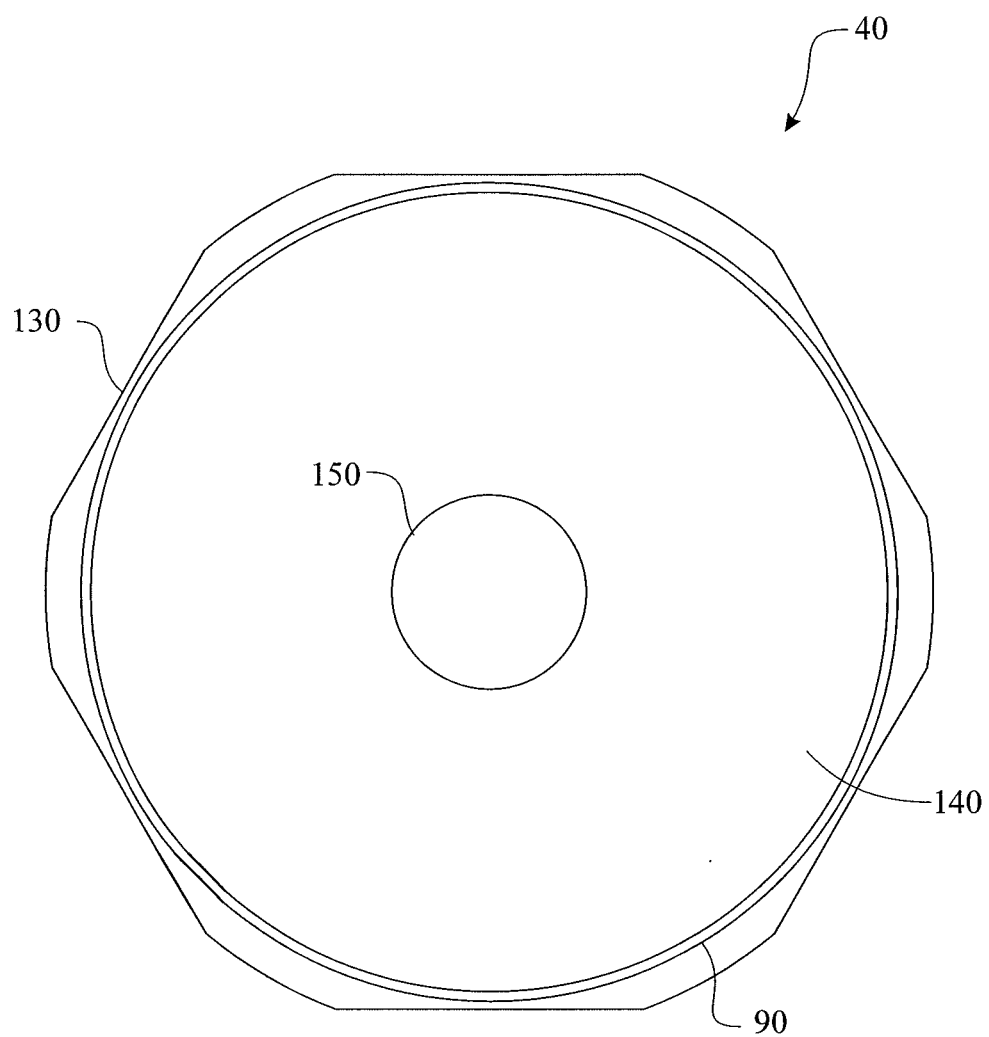
FIG. 2 is a bottom side view of the warning device of FIG. 1, according to a preferred embodiment of the present invention.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
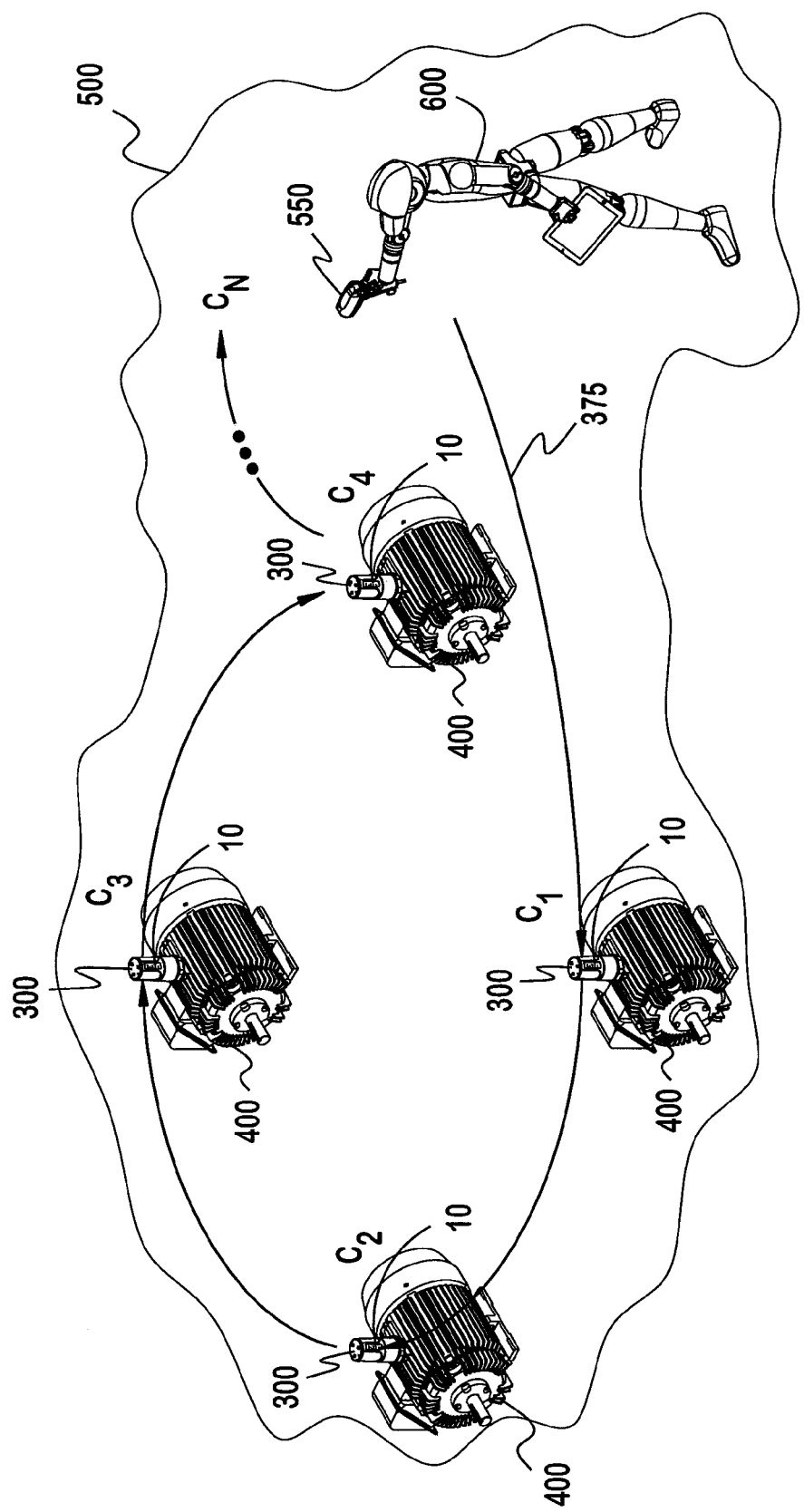
FIG. 6 is a perspective view of an industrial environment showing multiple pieces of machinery configured with the warning device of FIG. 1 according to a preferred embodiment of the present invention.

A warning device 10 for monitoring a health status of a bearing is illustrated in FIG. 1. The warning device is normally mounted to a piece of rotating industrial machinery 400 that is disposed in a manufacturing or operating environment 500. See FIG. 6 illustrating the warning device mounted to the machinery in the industrial environment. Typical applications for the warning device include motors, fans, conveyors and pumps.

Figure 3:
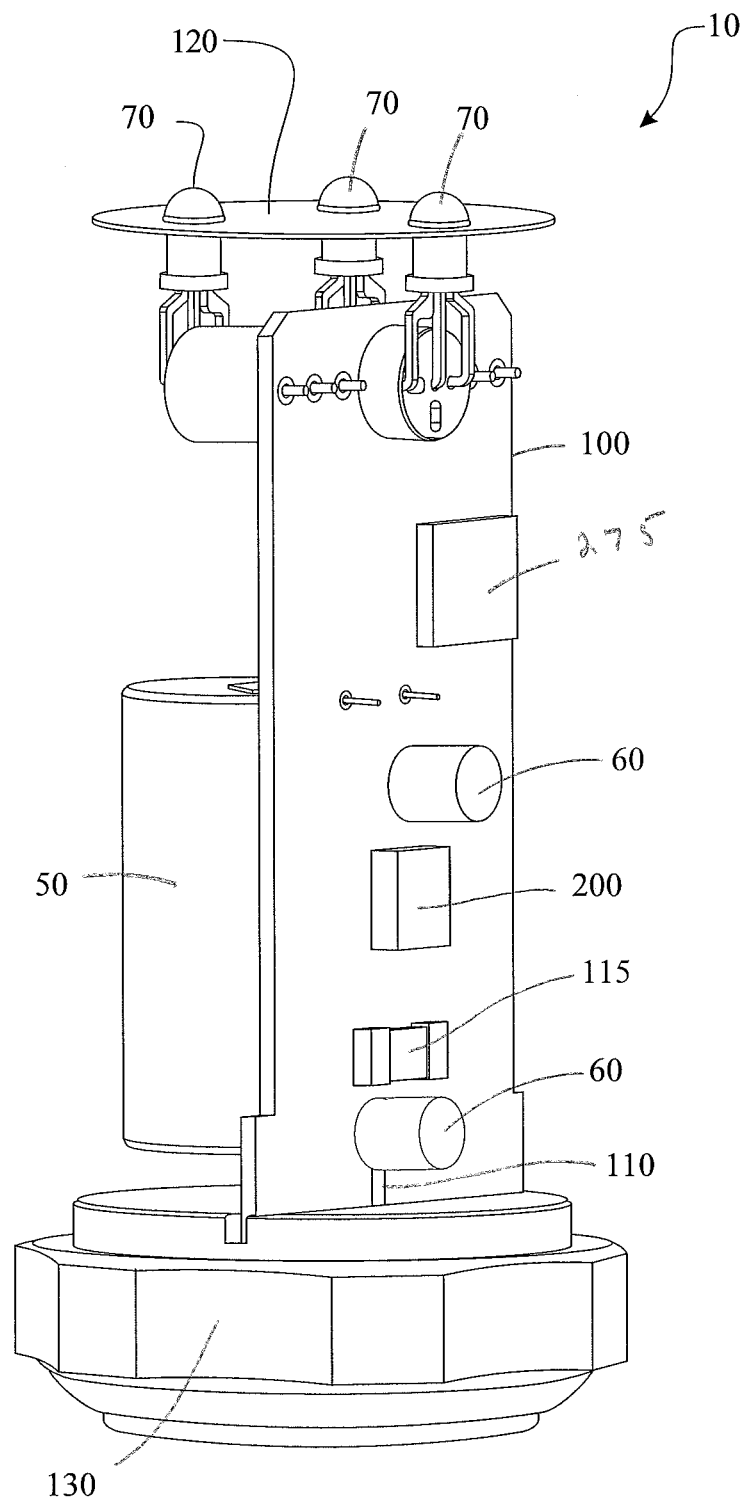
FIG. 3 is a perspective view of the warning device of FIG. 1 with the body removed, according to a preferred embodiment of the present invention

Referring back to FIG. 1, the warning device provides a generally cylindrical body portion 20 that is connected to an annular top portion 30. The annular top portion 30 includes at least one tri-color light emitting diode 70 (herein referred to as "LED") for displaying the health status of the bearing. The at least one tri-color LED is mounted on an upper top surface 120 of the annular top portion 30 of the warning device for maximum visibility to a user. Referring to FIG. 3, the at least one tri-color LED may further provide three translucent light emitting diodes (70) assembled in parallel on an upper top surface (120) of the device.

Depending on the voltage applied to the at least one tri-color LED 70, the LED may be configured to illuminate any one of red, green or translucent. Normally, the at least one tri-color LED functions to illuminate red or green. However, the LED used in the present invention is configured to illuminate translucent as well. In this case, the LED is energized to illuminate both red and green. The net affect of illuminating both red and green simultaneously, creates an amber illumination. The need for providing the three different colors will be disclosed in ensuing paragraphs. In an alternate embodiment, the at least one tri-color light emitting diode 70 may provide three light emitting diodes 70. The three light emitting diodes may be configured to illuminate red, green or translucent as well.

The warning device further provides at least one sensor 60 that senses at least one of a velocity, an enveloped acceleration and a temperature value of the bearing. Here, the at least one sensor 60 is mounted to a Printed Circuit Board 100 (PCB) (see FIG. 4), which is in turn potted inside the body 20 and base portion 40. One type of sensor employed may be a piezo-electric element that provides an acceleration signal, which is then processed to deliver the velocity and enveloped acceleration overall.

Consequently, the health status of the bearing is determined by input and feedback from one of the at least one sensors 60. The velocity relates to the whole machine which includes the shaft, bearing, coupling, footing, etc. The enveloped acceleration is designed to accentuate the bearing signal, but can pick up gear mesh too. Temperature is the bearing housing temp which relates to lubricant temperature, bearing temperature, and the fluid in a pump.

When a sensor senses a change in velocity or acceleration or temperature it sets off an alarm. In an alternate embodiment, the at least one sensor 60 may provide two temperature sensors 60 and an enveloped acceleration sensor (accelerometer) 115 for providing feedback. Velocity is calculated via the accelerometer 115. A range in velocity of 10-1000 KHz is within a normal sensing range. A range in machine rotational speed of 900-3600 rpm and maximum enveloped acceleration is 30 gE is within one of the at least one sensors 115 range.

The PCB as shown in FIG. 3 may include a band pass filter 200 to filter the signal and to eliminate low frequency structural machinery vibrations signals developed in the operating environment. The PCB may further include a demodulator (250) to demodulate and enhance the frequency content at a bearing defect frequency. Consequently, the band pass filter and demodulator act to improve the frequency response of the at least one acceleration sensor 115. Additionally, a processor/microcontroller 275 is provided for controlling the function of the device. The microcontroller 275 is a small computer on a single integrated circuit containing a processor core, memory, and programmable input/output peripherals (not shown).

Figure 4:
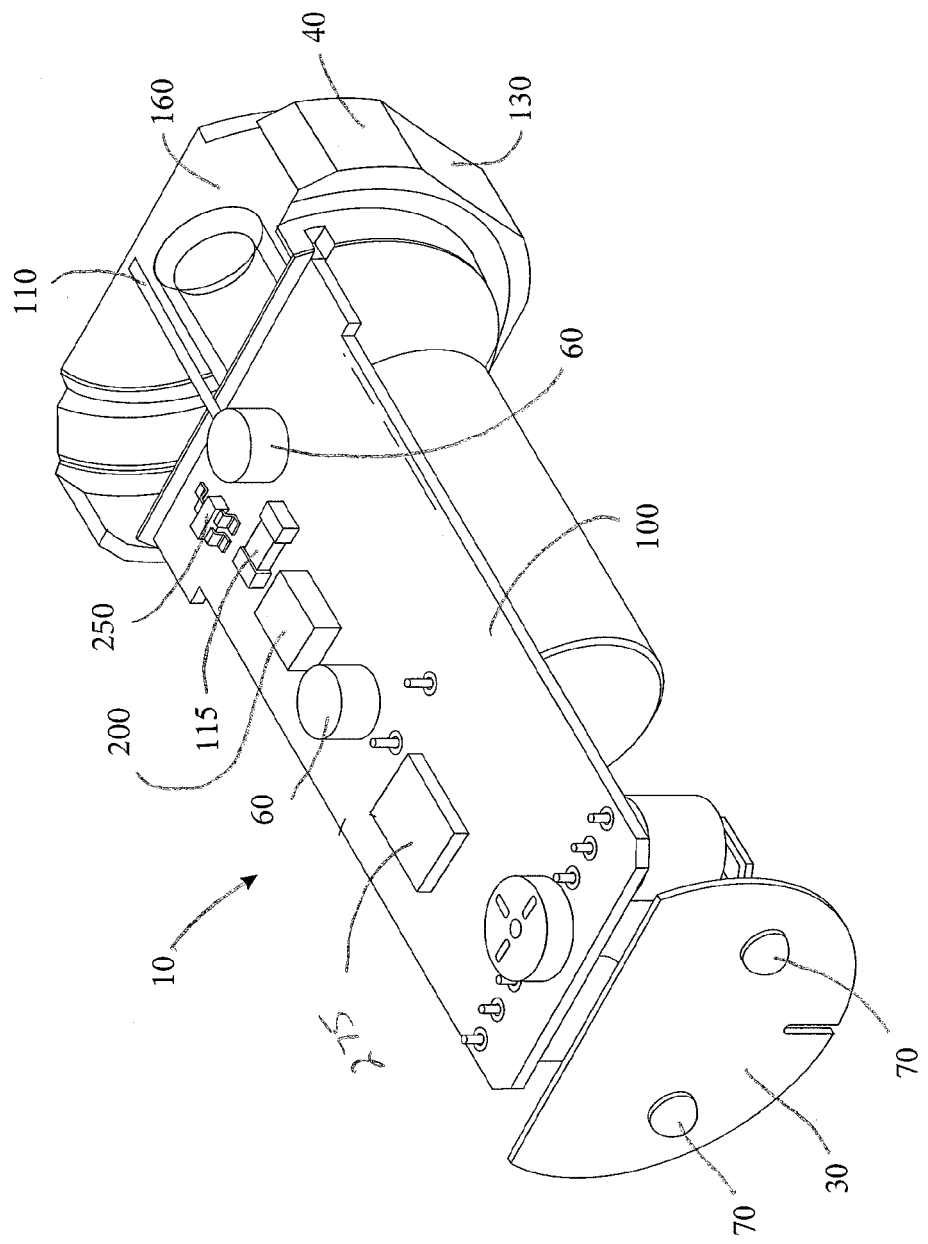
FIG. 4 is a partial cross-sectional view in perspective of the warning device of FIG. 1 with the body removed, according to a preferred embodiment of the present invention.

FIG. 4 shows the device having multiple temperature sensors 60. The warning device has at least one thermally conductive circuit board trace 110 that is integrally disposed within the mounting pad 90. The trace 110 is designed to conduct heat from the mounting pad 90 to one of the at least one sensors 60. This is one way the device obtains temperature feedback from a sensor.

Referring now to all the Figures, the warning device 10 also includes a base portion 40 that is connected to the body 20.

The base portion 40 provides a mounting pad 90 that is integral to the base portion 40. The base portion 40 is used to mount the warning device 10 to the piece of rotating industrial machinery 400. The mounting pad 90 has a generally flat surface 140 for mounting to the machinery 400. The mounting pad (90) is hexagonal in shape and has at least two flat surfaces (130) for tightening the warning device with a tool (not shown).

The mounting pad 90 also has a threaded through hole 150 that allows a bolt (not shown) to be threaded into. Typically, the bolt runs up through a clearance hole drilled in the machinery 400 and into the threaded through hole 150, thus securing the device 10. It should be noted that there are many other potential configurations for mounting the warning device that can be contemplated by one skilled in the art. For example, the warning device could be fixedly epoxied to the rotating machinery.

The warning device 10 further includes a battery 50 for powering the device 10. The battery can be a lithium battery rated for long life. Lithium batteries are disposable (primary) batteries that have lithium metal or lithium compounds as an anode. The battery is usually sealed in epoxy. As such, battery replacement is not possible. The battery (50) provides power to the device 10 for at least 3 years of normal operation. This is conditional on the device seeing a single alarm detection. Battery life decreases proportionally with the number of alarm detections. Consequently, one can expect two years of life with two alarm detections and one year of life after three alarm detections. The warning device must be manually reset after it detects an alarm condition. Therefore, if battery life permits, the warning device can be reset up to three times before replacement is required.

The warning device 10 is synchronized to a magnetic coded key (80). One of the at least one tri-color LED's blinks red for 10 seconds after the magnetic key is read. When the magnetic coded key 80 is applied next to the device 10 the device becomes activated. After the magnetic key is applied 80, the device 10 initiates a self check mode to verify its proper function. In operation, one of the at least one tri-color LED's 70 illuminates green when the device 10 passes its self check mode. Alternately, one of the at least one LED's 70 illuminates amber when the device fails its self check mode.

The device 10 is programmed to wake up a predetermined number of times over a 24 hour period in order to check if the industrial machine is in operation. Normally, the device wakes up 8 times per day, but this can be changed to meet a customers requirements. After waking up, at least one sensor evaluation of at least one of the velocity and enveloped acceleration and current temperature level of the industrial rotating machine is initiated. When the machine evaluation meets a minimum threshold, the device goes into an alarm mode. Further, one of the at least one tri-color light emitting diodes illuminates red after the alarm mode is verified.

Alternately, when the machine evaluation does not meet a minimum threshold after waking up and the sensor evaluation is initiated, the device goes back into a sleep mode to conserve power. The device wakes up a more frequent predetermined number of times after an alarm condition is verified. As such, one of the at least one tri-color light emitting diodes blinks red for one week after an alarm condition is verified.

Figure 5:
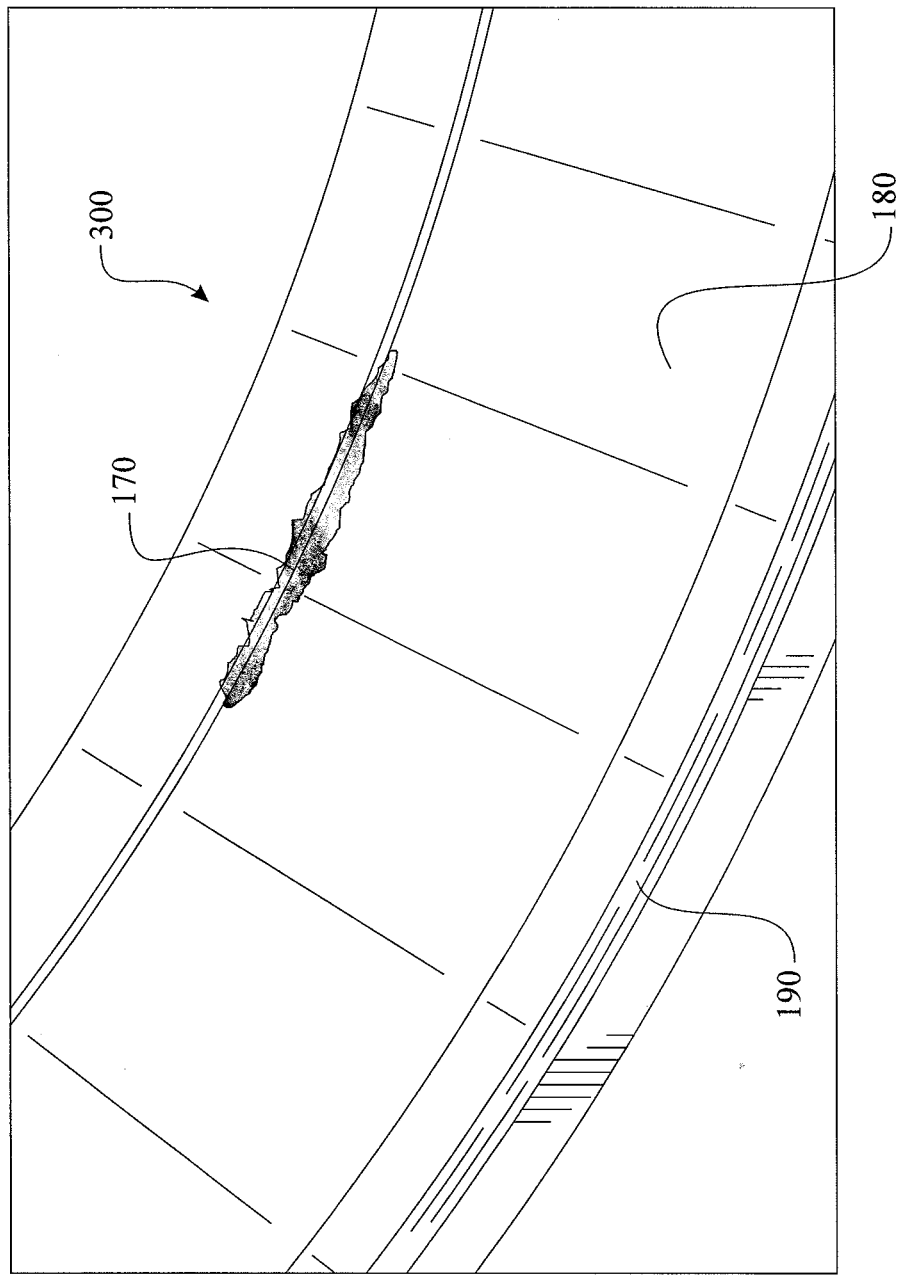
FIG. 5 is a partial view of an inner bearing raceway having $3^{rd}$ order defects.

A stage 3 bearing defect is illustrated in FIG. 5. The warning device of the present invention can detect a stage 3 bearing defect 150 prior to a catastrophic failure. FIG. 5 shows a bearing raceway 190 having an inner surface 180 and stage 3 sidebanding defects 170. In the third stage of failure, bearing defect frequency levels increase and their harmonics appear on the spectrum. As wear progresses, sidebanding increases around the defect frequencies and can be seen more clearly as raised levels and harmonics in the mounted resonance area.

FIG. 6 illustrates an operator 600 pointing an inspection device 550 at a bar code disposed 300 that is disposed on the warning device in the operating environment 500. The inspection device 550 having a bar code reader that is able to scan the bar code 300 at a series check points $C_1$, $C_2$, $C_3$ and $C_4$. The check points $C_1$-$C_4$ may further provide of a plurality of check points $C_n$ on a predetermined route 375 and the bar code 300 is one of a plurality of bar codes 300 on a plurality of warning devices 10 to be inspected. By making the operator conduct the inspection and record the status of each device, an operator driven reliability that proves the plurality of warning devices have been checked by the operator is generated.

Fixed readers are set up to create a specific interrogation zone which can be tightly controlled. This allows a highly defined reading area for when tags go in and out of the interrogation zone. Mobile readers may be hand-held or mounted on carts or vehicles.

Detailed Description of Embodiment Having a Close Range Wireless Interface

Figure 7:
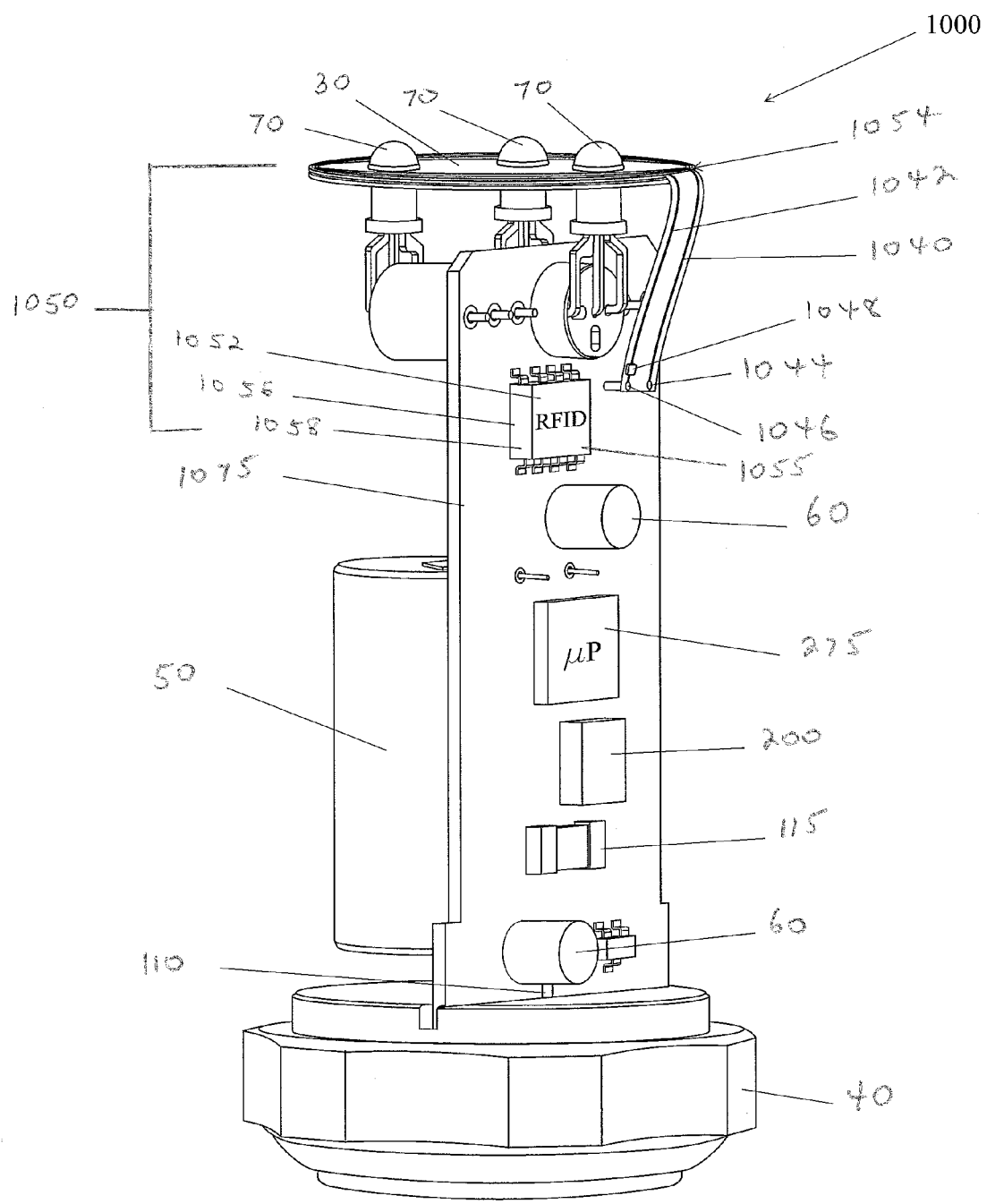
FIG. 7 is a perspective view of the warning device of FIG. 1 with the body removed, showing an antennae and RFID Tag according to a preferred embodiment of the present invention.

A warning device 1000 for monitoring a health status of a bearing mounted to a piece of rotating machinery 400 in an industrial environment 500 having a close range wireless interface 1050 is illustrated in FIG. 7. The warning device 1000 of this embodiment is the same as that of the prior embodiment 10 except for the introduction of the close range wireless interface 1050.

As previously disclosed, the warning device 10 includes a body portion 20 that is connected to a top portion 30 and a base portion 40. A battery 50 for powering the device is also included. Here, the battery 50 provides power to the RFID device 1000 for at least 3 years of normal operation with a single alarm detection. In addition, at least one sensor 60 and/or accelerometer 115 for sensing at least one of a velocity, an enveloped acceleration and a temperature reading of the bearing is provided. At least one illuminating device 70 for displaying the health status of the bearing according to input from one of the at least one sensors is further provided.

The close range wireless interface 1050 includes an RFID tag 1052 and an antenna 1054 mounted to a PCB 1075. The RFID tag 1052 has an integrated circuit 1055 for storing and processing information, and a radio 1056 for modulating and demodulating a radio-frequency signal. The antenna 1054 is connected to the RFID tag 1052 through the PCB and is configured for receiving and transmitting the modulated and demodulated signals. A bus connects the microcontroller 275 to the RFID tag 1052.

Here, the microcontroller 275 stores at least one of the sensed velocity, enveloped acceleration and the temperature values into a memory 1058 that is disposed within the integrated circuit 1055 of the RFID tag 1052. The memory 1058 is a dual access memory that enables data transfer via the RFID radio 1056 or via the high speed serial bus 1059. The at least one sensor value reading could be copied to the RFID tag's memory when a reading is initiated, previously taken or only when an alarm is detected. The microcontroller 275 also includes a memory that has the capability to concurrently store sensor value readings. As such, the sensor values are copied into the memory 1058 by the microcontroller 275 on the completion of any measurement taken or after the logging of an alarm event.

Here, the RFID memory 1058 may be a non-volatile memory that is used to store specific information regarding the RFID tag. The stored information in memory can alternately be password protected if so desired. As such, the RFID tag can store product-related information such as:
- a production date;
- a unique tag serial number;
- a machine or asset name;
- a description;
- a status;
- a measurement history; and/or
- a unique tags location.

Figure 8:
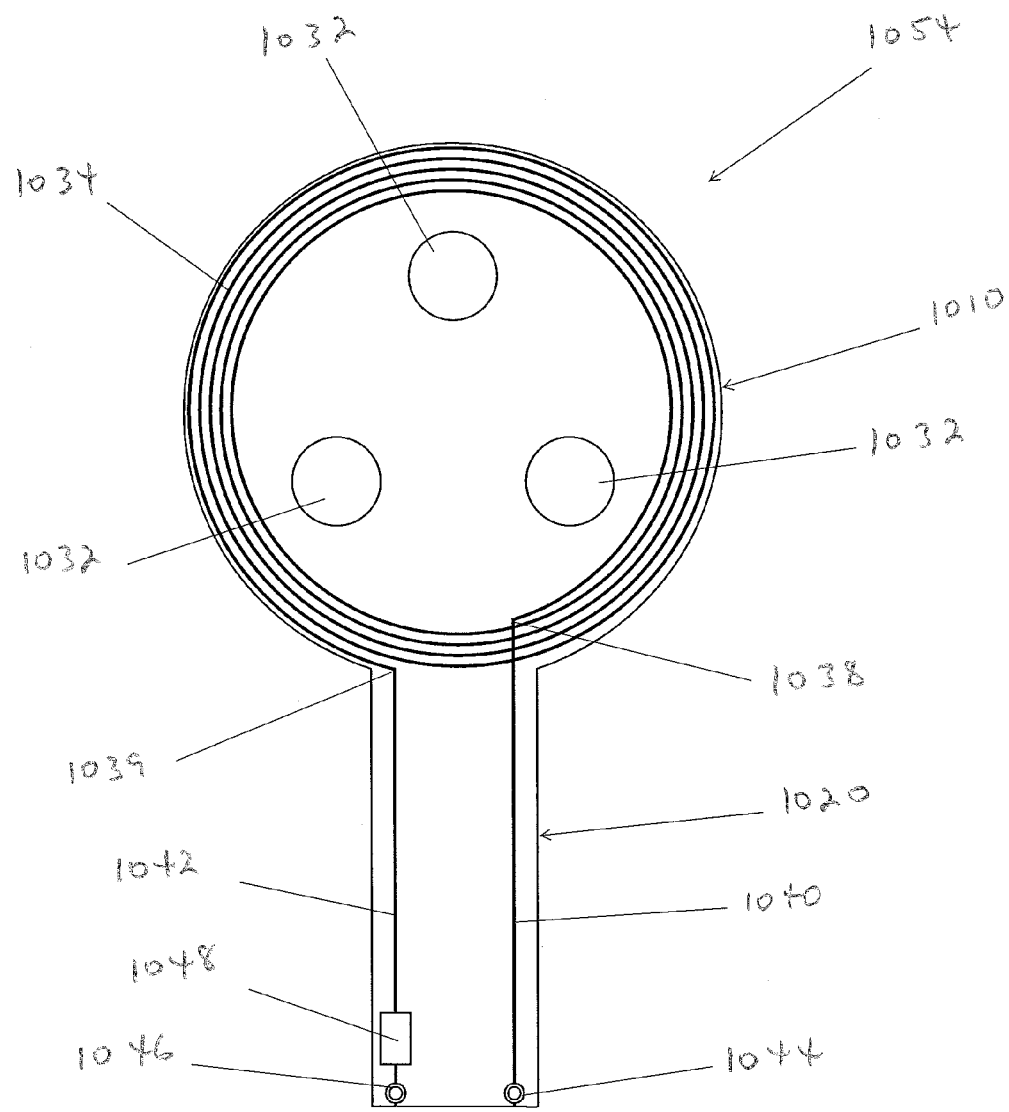
FIG. 8 is a top plan view of a flexible antenna circuit according to proffered embodiment of the present invention.

Referring to the embodiment of the warning device illustrated in FIGS. 7-8, the antenna 1054 is disposed within the top portion 30 of the warning device. As can be seen, the antenna 1054 is built into a flexible circuit 1054 which allows the antenna to be mounted horizontally but flexed 90 degrees mount to the PCB 1075. Therefore, the antenna can be connected to the RFID tag 1052 through a bus which is integrally mounted to the PCB 1075.

Here, the flexible antenna circuit 1054 is separated into two portions, a cylindrical portion 1010 and a lead portion 1020. The cylindrical portion 1010 includes three through holes 1032 that provide clearance for the LED's 70 on assembly. The cylindrical portion further includes at least one coil of copper wire 1034 which is disposed within the flexible antenna circuit 1054. The at least two coils of copper wire 1034 are typically tuned loops of copper wire 1034 and are used to receive and transmit the modulated and demodulated signals. The configuration shown in FIG. 8 provides four coils of copper wire 1034.

The lead portion 1020 of the flexible circuit 1030 provides a first lead wire 1040 and a second lead wire 1042 that connect to the bent ends 1038, 1039 of the at least one coil of copper wire 1034. The first lead wire 1040 terminates at a first stake 1044 and the second lead wire 1042 terminates at a second stake 1046 through capacitor 1048. The capacitor 1048 completes the LC circuit required to function as an antenna.

Figure 9:
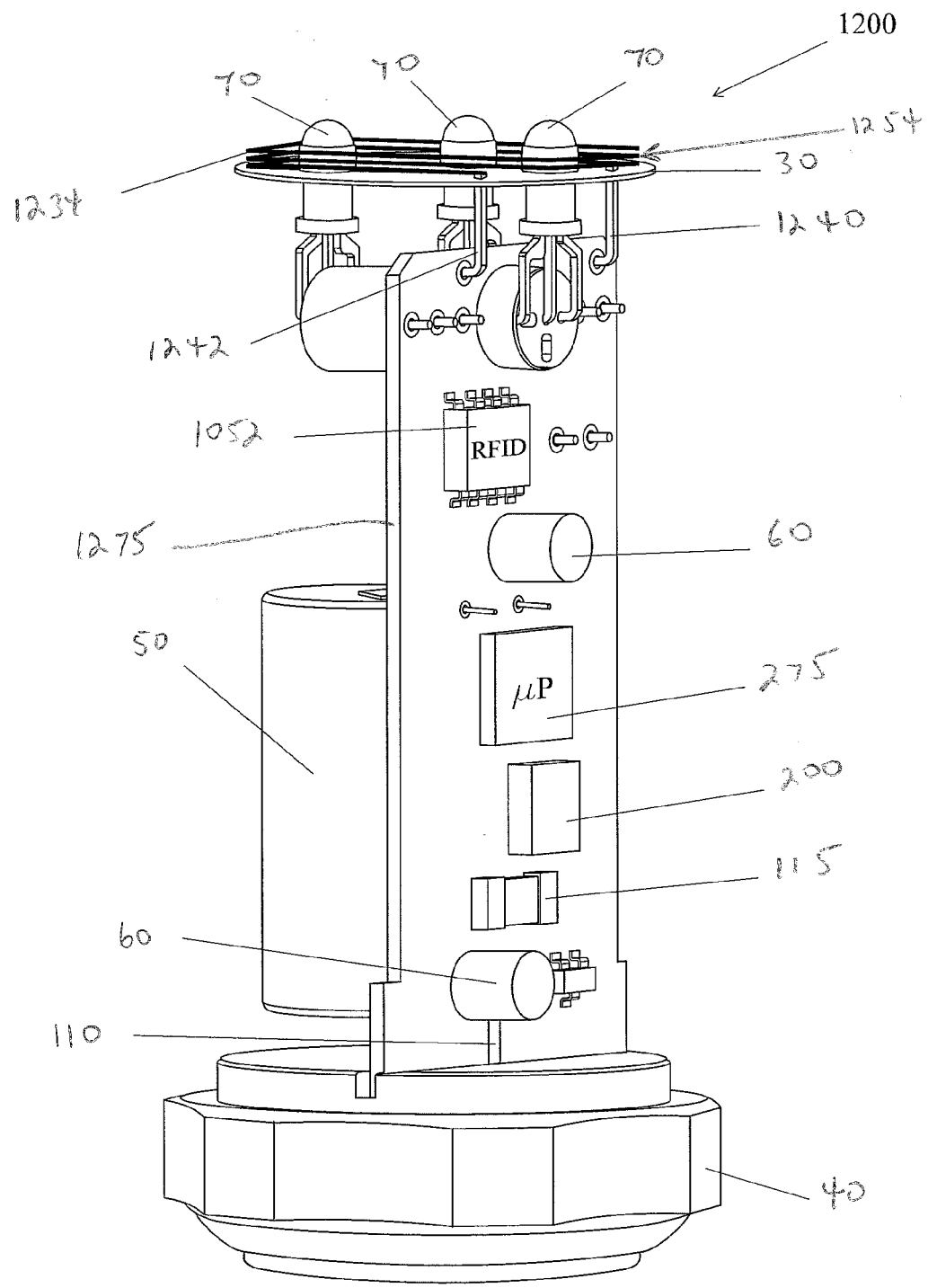
FIG. 9 is a perspective view of the warning device of FIG. 1 with the body removed, showing an antennae and RFID Tag according to another preferred embodiment of the present invention.

Now referring to the embodiment of warning device 1200 that is illustrated in FIG. 9, everything is the same with respect to the previous embodiment 1000 except antenna 1254 includes at least two tuned coiled loops of copper wire 1234 that lay on top of the top portion 30. Here, the ends of the copper wire are terminated to solid leads 1240, 1242, which in turn get staked into PBC 1275. Here again, the antenna is configured for receiving and transmitting the modulated and demodulated signals. A bus connects the antenna to the RFID tag 1052 and on to the microprocessor 275. A digital bus is employed in the current embodiment, but there are other types of buses that could be utilized to accomplish this function. For example, a high speed serial bus could be provided.

Figure 10:
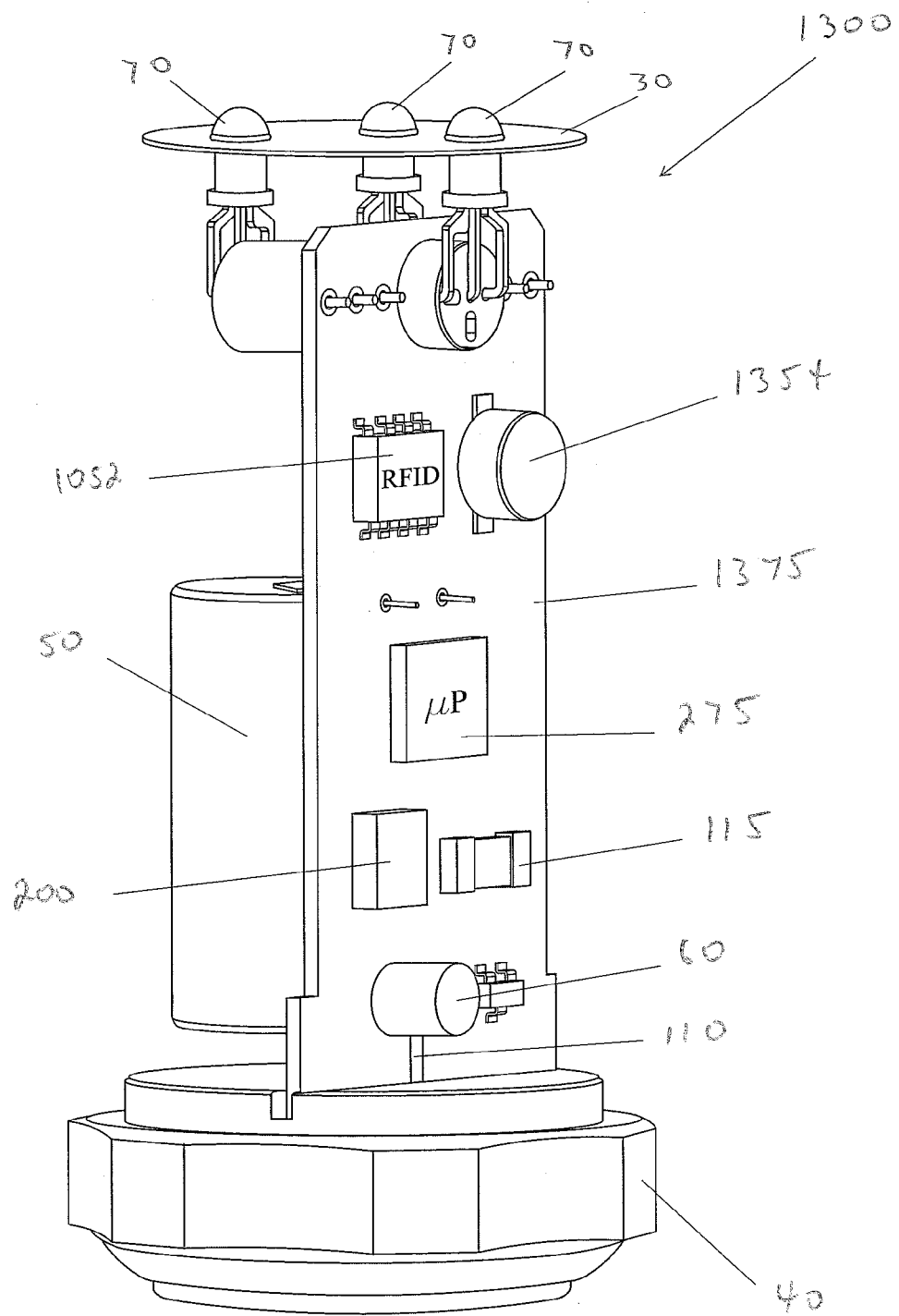
FIG. 10 is a perspective view of the warning device of FIG. 1 with the body removed, showing an antennae and RFID Tag according to another preferred embodiment of the present invention.

Now referring to the embodiment of warning device 1300 that is illustrated in FIG. 10, everything is the same with respect to the previous embodiment 1000 except antenna 1354 includes a coiled inductor directly mounted on PCB 1375. Here again, the antenna 1354 is configured for receiving and transmitting the modulated and demodulated signals. A digital bus connects the antenna 1354 to the RFID tag 1052 and on to the microprocessor 275.

A method 1500 of monitoring algorithm parameters in any one of the previously described embodiments of the warning device 1000, 1200 and 1300 having the close range wireless interface will now be disclosed. The method steps 1500 are illustrated in FIG. 11. Method 1500 includes providing the RFID tag having the integrated circuit with memory for storing and processing information, and the radio for modulating and demodulating radio-frequency signals. Also provided is an antenna for receiving and transmitting the modulated and demodulated radio-frequency signals. The antenna is electrically connected to the RFID tag through the digital bus which further connects the microcontroller to the RFID tag.

As shown in step 1520, the monitoring algorithm parameters are downloaded from a portable read/write device shown in step 1510. The portable read/write device could be for example, a Microlog Inspector CMDM 6600 configured with an RFID attachment, manufactured by SKF. When the portable read/write device initiates a write operation, the antenna receives the new parameters and transmits them into the memory disposed within the RFID tag. In step 1530, the microcontroller 275 accesses the newly stored parameters stored within the RFID tag's memory over the digital or high speed serial bus. The alarm and monitoring algorithm parameters are then adapted in step 1540 according to the newly accessed parameters. So, alarm levels like time, temperature, velocity and enveloped acceleration can be adjusted by simply initiating contact between the read/write device and the close range RFID interface disposed within the warning device.

Method 1600 of the present invention additionally contemplates reading at least one stored sensor value from a warning device for monitoring a health status of a bearing having a close range wireless interface. As previously disclosed in Method 1500, Method 1600 also includes providing the RFID tag having the integrated circuit with memory for storing and processing information, and the radio for modulating and demodulating radio-frequency signals. Also provided is an antenna for receiving and transmitting the modulated and demodulated radio-frequency signals. The antenna is connected to the RFID tag through the digital or high speed serial bus which further connects the microcontroller to the RFID tag.

When the portable read/write device initiates a read operation as shown in FIG. 12, the antenna receives a signal to initiate the uploading of at least one sensor value measurement or parameter. In step 1620, the method optionally provides for uploading parameters from memory. Here, the function of method 1600 is reversed from that of method 1500 and parameters may uploaded into the read/write device rather than downloaded. This enables a user to observe the preprogrammed alarm and monitoring algorithm parameters. The user may just collect this data for future reference or use it to help make decisions to reprogram the current warning device.

In step 1630, the RFID tag then initiates the uploading of the at least one stored sensor value from the memory through the radio and antenna into the reads/write device. Here, the at least one sensor value reading may be one of a velocity, enveloped acceleration and a temperature of the bearing disposed within the piece of rotating industrial equipment. Further, the at least one sensor value reading could be a time waveform or an FFT.

Therefore, the dual memory disposed within the RFID tag enables data transfer via the RFID radio or via the digital bus. This capability allows the warning device to function as both a reading and/or writing device.

The invention claimed is:

1. A warning device for monitoring a health status of a bearing mounted to a piece of rotating machinery in an industrial environment, the warning device comprising:
    a housing having a body portion connected to a top portion and a base portion;
    a microcontroller for controlling the device;
    a battery for powering the device;
    at least one sensor for sensing at least one of a velocity, an enveloped acceleration and a temperature reading of the bearing;

three light emitting diodes mounted to the housing and configured to display a health status of the bearing according to input from one of the at least one sensor; and a close range wireless interface including:
an RFID tag having an integrated circuit for storing and processing information, and a radio for modulating and demodulating a radio-frequency signal,
an antenna for receiving and transmitting the modulated and demodulated signal, and connected to the RFID tag, and
a digital bus connecting the microcontroller to the RFID tag,
wherein the microcontroller stores at least one of the sensed velocity, enveloped acceleration and the temperature values into a memory disposed within the RFID tag, and
wherein the memory is a dual access memory that enables data transfer via the RFID radio or via the digital bus.

2. The warning device for monitoring a health status of a bearing according to claim 1, wherein the RFID tag further comprises a non-volatile memory that stores the RFID tag's information.

3. The warning device for monitoring a health status of a bearing according to claim 1, wherein the RFID tag stores a production date.

4. The warning device for monitoring a health status of a bearing according to claim 1, wherein the RFID tag stores a unique tag serial number.

5. The warning device for monitoring a health status of a bearing according to claim 1, wherein the RFID tag stores a machine or asset name.

6. The warning device for monitoring a health status of a bearing according to claim 1, wherein the RFID tag stores a description.

7. The warning device for monitoring a health status of a bearing according to claim 1, wherein the RFID tag stores a status.

8. The warning device for monitoring a health status of a bearing according to claim 1, wherein the RFID tag stores a measurement history.

9. The warning device for monitoring a health status of a bearing according to claim 6, wherein the RFID tag further stores the unique tags location.

10. The warning device for monitoring a health status of a bearing according to claim 1, wherein the antenna is disposed within the top portion.

11. The warning device for monitoring a health status of a bearing according to claim 1, wherein the battery provides power to the RFID device for at least 3 years of normal operation with a single alarm detection.

12. The warning device for monitoring a health status of a bearing according to claim 1, further comprising a flex circuit built into the RFID antenna, the flex circuit connecting the antenna to the RFID tag.

13. The warning device for monitoring a health status of a bearing according to claim 1, wherein the RFID antenna further comprises a coil inductor mounted on a PCB, the inductor coil connecting the antenna to the RFID tag.

14. The warning device for monitoring a health status of a bearing according to claim 1, wherein the RFID antenna further comprises tuned loops of copper wire, the tuned loops of wire connecting the antenna to the RFID tag.

15. The warning device for monitoring a health status of a bearing according to claim 1, wherein access to the RFID tag is password protected.

16. The warning device for monitoring a health status of a bearing according to claim 1, wherein the digital bus is a high speed serial bus.

17. The warning device for monitoring a health status of a bearing according to claim 1, wherein the warning device is remotely activated using a magnetic coded key.

18. The warning device for monitoring a health status of a bearing according to claim 1, wherein the microcontroller, the battery, the at least one sensor, and the close range wireless interface are contained within the housing.

* * * * *